US011067999B2

(12) United States Patent
Qiu et al.

(10) Patent No.: US 11,067,999 B2
(45) Date of Patent: Jul. 20, 2021

(54) VEHICLE AND DELIVERY SYSTEM

(71) Applicant: TOYOTA JIDOSHA KABUSHIKI KAISHA, Toyota (JP)

(72) Inventors: Zekai Qiu, Nisshin (JP); Hironobu Kitaoka, Nisshin (JP); Naoki Yamamuro, Nagoya (JP); Kozo Kosho, Toyota (JP); Hiroaki Sugiyama, Nagoya (JP); Makoto Ikegami, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/163,524

(22) Filed: Oct. 17, 2018

(65) Prior Publication Data

US 2019/0121367 A1 Apr. 25, 2019

(30) Foreign Application Priority Data

Oct. 20, 2017 (JP) .............................. JP2017-203745

(51) Int. Cl.
*G05D 1/02* (2020.01)
*F25B 13/00* (2006.01)
(Continued)

(52) U.S. Cl.
CPC .............. *G05D 1/0285* (2013.01); *B60P 3/20* (2013.01); *F25B 13/00* (2013.01); *F25D 11/003* (2013.01);
(Continued)

(58) Field of Classification Search
CPC .... B60P 3/20; F25B 13/00; F25B 1/00; F25D 11/003; F25D 29/003; F25D 2700/12;
(Continued)

(56) References Cited

U.S. PATENT DOCUMENTS

2012/0278454 A1* 11/2012 Stewart .................. H04L 67/34
709/220
2014/0317005 A1* 10/2014 Balwani ............. G06Q 10/0832
705/317

(Continued)

FOREIGN PATENT DOCUMENTS

| JP | 2001-147075 A | | 5/2001 |
| JP | 2002259521 A | | 9/2002 |
| JP | 200620622 A | * | 8/2006 |

OTHER PUBLICATIONS

Kazunori, Translation for the reference JP2001147075, (Year: 2001).*
English translation for reference JP2006206225A (Year: 2006).*

*Primary Examiner* — Rachid Bendidi
(74) *Attorney, Agent, or Firm* — Hunton Andrews Kurth LLP

(57) ABSTRACT

A vehicle includes: a cooling box in which a delivery item delivered by a deliverer can be accommodated; a communication device configured to communicate with at least one of a server and a deliverer terminal that is used by the deliverer for delivery; and a communication device configured to acquire a target value of a temperature inside the cooling box from outside. The vehicle acquires the target value of the temperature inside the cooling box from at least one of the server and the deliverer terminal.

6 Claims, 11 Drawing Sheets

(51) Int. Cl.
| | |
|---|---|
| *F25D 11/00* | (2006.01) |
| *B60P 3/20* | (2006.01) |
| *G05D 1/00* | (2006.01) |
| *G01C 21/34* | (2006.01) |
| *F25D 29/00* | (2006.01) |
| *F25B 1/00* | (2006.01) |

(52) U.S. Cl.
CPC ......... *F25D 29/003* (2013.01); *G01C 21/343* (2013.01); *G05D 1/0011* (2013.01); *G05D 1/0212* (2013.01); *F25B 1/00* (2013.01); *F25D 2700/12* (2013.01)

(58) Field of Classification Search
CPC .. G01C 21/343; G05D 1/0011; G05D 1/0212; G05D 1/0285
See application file for complete search history.

(56) References Cited

U.S. PATENT DOCUMENTS

| | | | |
|---|---|---|---|
| 2017/0061521 A1* | 3/2017 | Lee | G06Q 30/0631 |
| 2017/0203633 A1* | 7/2017 | High | B60H 1/00735 |
| 2017/0219279 A1* | 8/2017 | Chae | F25D 11/00 |

* cited by examiner

FIG.8

REQUEST INFORMATION DB

| REQUESTER ID | ○○○ | ○○○ |
|---|---|---|
| DELIVERY ITEM ID | ○○○ | ○○○ |
| DELIVERY ITEM | ○○○ | ○○○ |
| PACKAGE RECIPIENT | ○○○ | ○○○ |
| DESTINATION | ○○○ | ○○○ |
| DELIVERY TIME | ○○○ | ○○○ |
| CONTACT INFORMATION OF PACKAGE RECIPIENT | ○○○ | ○○○ |

FIG.9

REGISTERED VEHICLE DB

| REGISTERED VEHICLE ID | ○○○ | ○○○ |
|---|---|---|
| VEHICLE NUMBER | ○○○ | ○○○ |
| REQUESTER ID | ○○○ | ○○○ |
| COMMUNICATION ID | ○○○ | ○○○ |
| REGISTRANT CONTACT INFORMATION | ○○○ | ○○○ |
| VEHICLE TYPE/COLOR | ○○○ | ○○○ |
| POSITION INFORMATION | ○○○ | ○○○ |

FIG.10

DELIVERER DB

| DELIVERER ID | ○○○ | ○○○ |
|---|---|---|
| DELIVERER MOBILE PHONE NUMBER | ○○○ | ○○○ |
| DELIVERER NAME | ○○○ | ○○○ |
| POSITION INFORMATION | ○○○ | ○○○ |
| DELIVERER TERMINAL ID | ○○○ | ○○○ |

FIG.11

AUTHENTICATION CODE DB

| REGISTERED VEHICLE ID | ○○○ | ○○○ |
|---|---|---|
| CODE INFORMATION | ○○○ | ○○○ |

FIG.12

STORAGE INFORMATION DB

| COMMODITY NAME | STORAGE TYPE | STORAGE TEMPERATURE |
|---|---|---|
| HAM | REFRIGERATION REQUIRED | 5°C |
| FROZEN FRIED RICE | FREEZING REQUIRED | -5°C |
| ICE CREAM | FREEZING REQUIRED | -7°C |

FIG.13

DELIVERY ITEM DB

| DELIVERY ITEM ID | ○○○ | ○○○ |
|---|---|---|
| DELIVERY ITEM | ○○○ | ○○○ |
| PACKAGE RECIPIENT | ○○○ | ○○○ |
| DESTINATION | ○○○ | ○○○ |
| DESTINATION CONTACT INFORMATION | ○○○ | ○○○ |
| DELIVERY DATE AND TIME | ○○○ | ○○○ |
| DELIVERER TERMINAL ID | ○○○ | ○○○ |
| AUTHENTICATION INFORMATION | ○○○ | ○○○ |
| STORAGE INFORMATION | ○○○ | ○○○ |
| CONTACT INFORMATION OF PACKAGE RECIPIENT | ○○○ | ○○○ |

VEHICLE AND DELIVERY SYSTEM

This nonprovisional application is based on Japanese Patent Application No. 2017-203745 filed on Oct. 20, 2017 with the Japan Patent Office, the entire contents of which are hereby incorporated by reference.

BACKGROUND

Field

The present disclosure relates to a vehicle and a delivery system.

Description of the Background Art

Japanese Patent Laying-Open No. 2001-147075 discloses a refrigerator and a refrigeration system that includes a remote controller disposed at a position located away from the refrigerator.

In the above-described refrigeration system, the refrigerator transmits information such as a temperature inside the refrigerator to the remote controller to thereby allow a user located away from the refrigerator to obtain the temperature inside the refrigerator and also to change the set temperature of the temperature inside the refrigerator.

SUMMARY

The inventors of the present application have been studying a delivery system by which a delivery item can be delivered to a vehicle equipped with a cooling box.

In the above-described delivery system, some delivery items need to be cooled inside the cooling box while being stored therein. For example, for frozen foods such as ice creams, the temperature inside the cooling box needs to be set to the freezing point or lower. Also, some foods need to be stored at a normal temperature or lower.

However, when a vehicle cannot acquire the information about the storage temperature of the accommodated delivery item, the temperature inside the cooling box cannot be set at an appropriate temperature for the delivery item. On the other hand, it may take considerable time until the user actually receives the delivery item after the delivery item is delivered to the cooling box of the vehicle.

As a result, depending on the type of delivery item, the quality of some delivery items may deteriorate before the user actually receives the products.

The present disclosure has been made in light of the above-described problems. An object of the present disclosure is to provide: a delivery system allowing a delivery item to be delivered to a vehicle equipped with a cooling box; and the vehicle, by which a delivery item can be stored in a cooling box while suppressing a deterioration in quality of the delivery item.

A vehicle according to the present disclosure includes: a cooling box in which a delivery item can be accommodated; and a communication device configured to communicate with at least one of a server and a deliverer terminal that is used by a deliverer during delivery. The communication device is configured to acquire a target value of an environment inside the cooling box from at least one of the server and the deliverer terminal.

According to the above-described vehicle, the temperature inside the cooling box can be set at an appropriate temperature for storing a delivery item, so that a deterioration in quality of the delivery item can be suppressed.

The communication device is configured to acquire the target value before completion of placement of the delivery item in the cooling box so as to be accommodated therein. According to this vehicle, the temperature inside the cooling box can be set in advance at an appropriate temperature for storing the delivery item.

The communication device is configured to transmit information showing the environment inside the cooling box to at least one of the server and the deliverer terminal before completion of placement of the delivery item so as to be accommodated.

According to the above-described vehicle, the server can arrange a schedule such that a delivery item is delivered at the timing when the environment inside the cooling box is prepared. Also, when the environment inside the cooling box is not prepared at the time of delivery, the deliverer can take steps, for example, to communicate with a user without placing the delivery item in the cooling box.

A delivery system includes: a vehicle including a cooling box in which a delivery item can be accommodated; a user terminal configured to be operated by a user; a deliverer terminal configured to be operated by a deliverer who delivers a delivery item; and a server configured to communicate with the user terminal and the deliverer terminal. The vehicle is configured to acquire a target value of a temperature inside the cooling box from at least one of the server and the deliverer terminal.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 is a schematic diagram schematically showing a request information database 48.

FIG. 9 is a diagram schematically showing a registered vehicle database 44.

FIG. 10 is a diagram schematically showing a deliverer database 45.

FIG. 11 is a diagram schematically showing an authentication code database 46.

FIG. 12 is a diagram schematically showing a storage information database 49.

FIG. 13 is a diagram schematically showing a delivery item database 43.

DESCRIPTION OF THE PREFERRED EMBODIMENTS

First Embodiment

Figure 1:
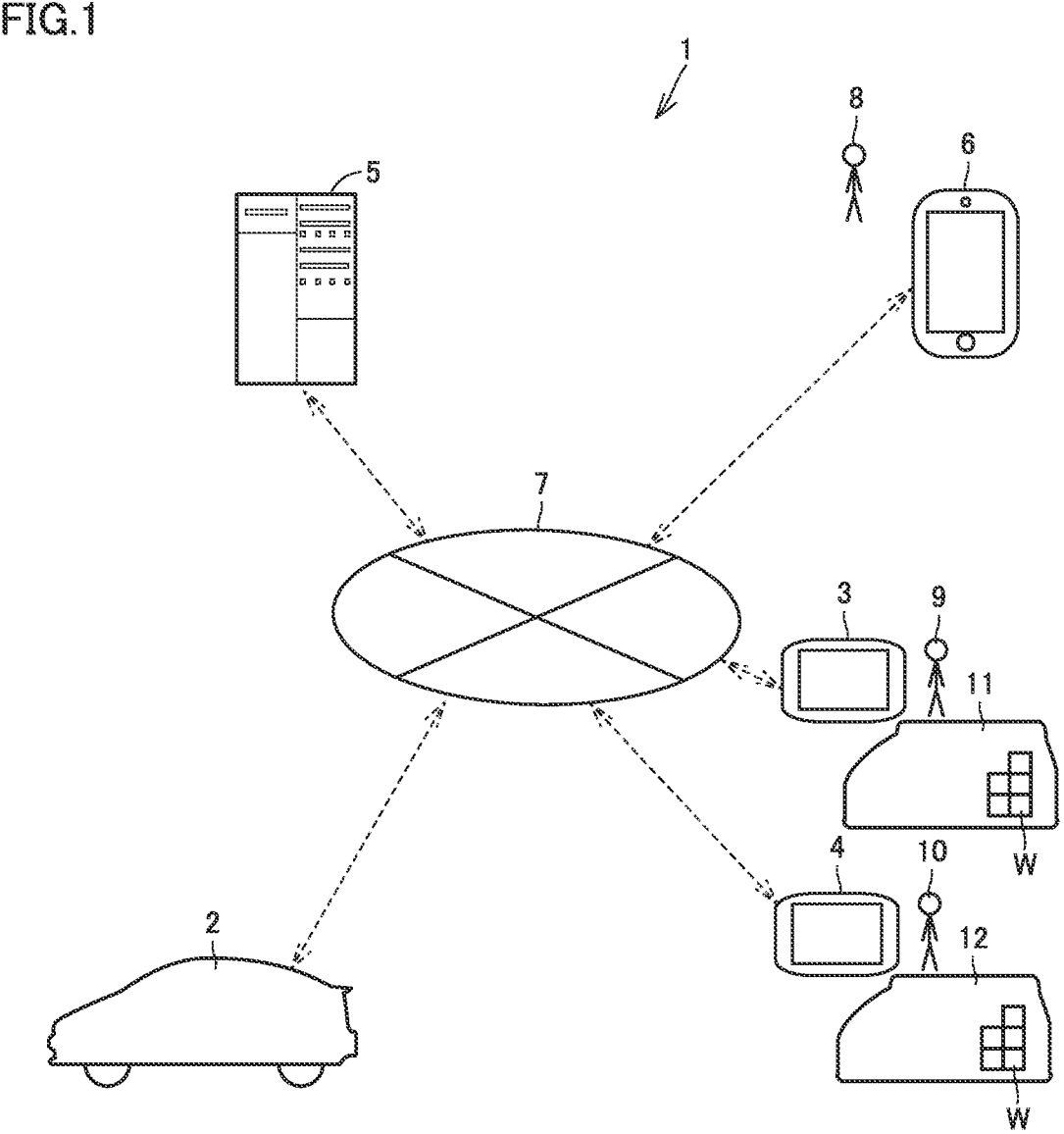
FIG. 1 is a block diagram schematically showing a delivery system 1.

Referring to FIGS. 1 to 17, a delivery system 1 according to the present embodiment will be hereinafter described. Among the configurations shown in FIGS. 1 to 17, the same or substantially the same configurations are designated by the same reference characters, and description thereof will not be repeated.

FIG. 1 is a block diagram schematically showing a delivery system 1. Delivery system 1 includes a vehicle 2, deliverer terminals 3 and 4, a server 5, a user terminal 6, and the Internet 7.

Vehicle 2, deliverer terminals 3 and 4, server 5, and user terminal 6 are configured to be capable of communicating with one another through the Internet 7.

Deliverer terminal 3 is used by a deliverer 9 for delivering a delivery item W. Deliverer terminal 4 is used by a deliverer 10 for delivering delivery item W.

Based on the information displayed on deliverer terminals 3 and 4, deliverers 9 and 10, respectively, deliver delivery items W to their respective designated addresses.

User terminal 6 is used by a user 8 who utilizes delivery system 1. Examples of user terminal 6 may be a personal computer, a smart phone, a mobile phone, and the like.

User 8 can input various pieces of information through user terminal 6. For example, user 8 may access the online shopping homepage to purchase a commodity, and also may designate the cooling box provided in vehicle 2 as the destination to which the commodity is delivered.

Server 5 is configured to be capable of communicating with vehicle 2, deliverer terminals 3 and 4, and user terminal 6 through the Internet 7. Using the information transmitted from each of vehicle 2, deliverer terminals 3, 4, and user terminal 6, and also using the information stored in server 5, server 5 transmits various pieces of information to vehicle 2, deliverer terminals 3 and 4, and user terminal 6.

Then, based on the information transmitted from server 5 and the like, deliverers 9 and 10 deliver the delivery items, for example, to vehicle 2 and the like.

Figure 2:
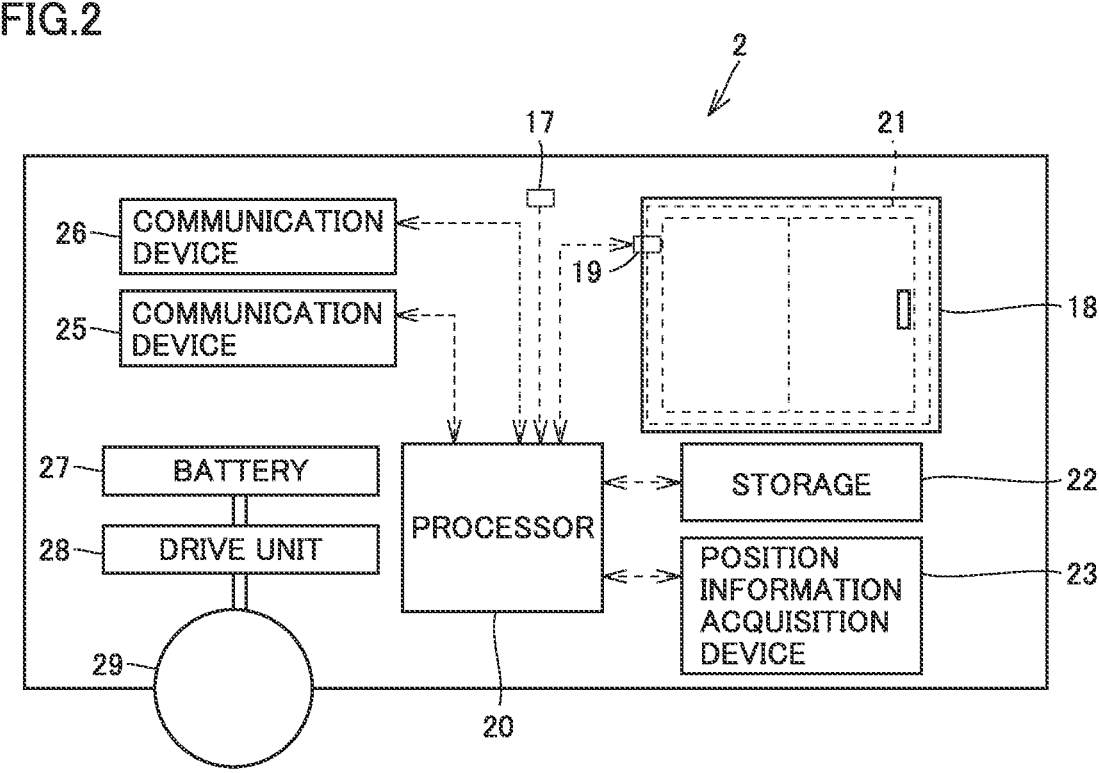
FIG. 2 is a block diagram showing the configuration of a vehicle 2.

FIG. 2 is a block diagram showing the configuration of vehicle 2. Vehicle 2 includes an outside door 18, a lock 19, a processor 20, a cooling box 21, a storage 22, a position information acquisition device 23, a communication device 25, a communication device 26, a battery 27, a drive unit 28, and a driving wheel 29.

Processor 20 is configured to perform computation processing using the information stored in storage 22, the information acquired through communication device 25, and the like. The computation processing by processor 20 may be performed by software or by hardware such as an electrical circuit.

Storage 22 serves as a non-volatile memory in which various pieces of information is stored. In addition, storage 22 includes a database used for controlling the temperature inside cooling box 21.

Position information acquisition device 23 is configured to acquire the position information of vehicle 2. The method of acquiring the position information of vehicle 2 may be a method of acquiring the position information from WiFi (Wireless Fidelity), a method of acquiring the position information using a GPS (Global Positioning System), and the like. The position information acquired by position information acquisition device 23 is transmitted to processor 20.

Communication device 25 is configured to communicate with server 5 and user terminal 6 through the Internet 7.

Communication device 26 is configured to communicate with deliverer terminals 3 and 4. For example, communication device 26 is configured to acquire an authentication code and the storage information of delivery item W or to transmit the information inside the cooling box. Communication device 26 is configured to transmit and receive a signal through Bluetooth Low Energy (BLE) communication, for example. Also, communication device 25 may include the function of communication device 26 or communication device 26 may include the function of communication device 25. In other words, communication devices 25 and 26 are configured to be capable of communicating with at least one of server 5 and deliverer terminals 3, 4.

Battery 27 is a secondary battery, which can be charged with electric power and from which electric power can be discharged. For example, a lithium-ion secondary battery and the like may be employed.

Drive unit 28 includes a DCDC converter, an inverter, and a motor. The DCDC converter raises the voltage of the direct-current (DC) power supplied from battery 27 and supplies the DC power to the inverter. The inverter converts the DC power supplied from the DCDC converter into alternating-current (AC) power and supplies the converted AC power to the motor. The motor is driven by the AC power supplied from the inverter to thereby drive driving wheel 29.

Outside door 18 is provided on the outer surface of vehicle 2. When outside door 18 is opened, cooling box 21 can become accessible. For example, for placing delivery item W in cooling box 21 so as to be accommodated therein, deliverer 9 first opens outside door 18 before deliverer 9 can place delivery item W in cooling box 21.

Lock 19 is configured to keep outside door 18 in the closed state. Based on the signal from processor 20, lock 19 switches the state of outside door 18 between: the state where outside door 18 can be opened and closed; and the state where outside door 18 is kept in the closed state.

Figure 3:
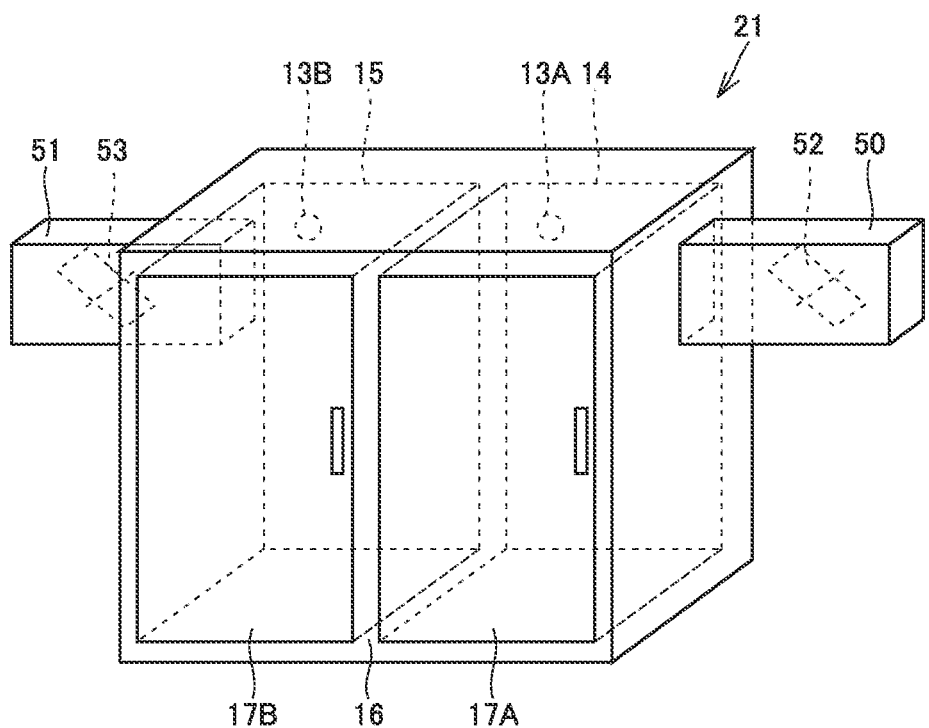
FIG. 3 is a perspective view schematically showing a cooling box 21.

FIG. 3 is a perspective view schematically showing cooling box 21. Cooling box 21 includes a main body 16, doors 17A and 17B, and temperature sensors 13A and 13B. Inside cooling box 21, a refrigerating chamber 14 and a freezing chamber 15 are provided.

Door 17A is configured to be openable and closable for refrigerating chamber 14. Door 17B is configured to be openable and closable for freezing chamber 15.

Temperature sensor 13A is provided inside refrigerating chamber 14 and configured to measure the temperature inside refrigerating chamber 14. Temperature sensor 13B is provided inside freezing chamber 15 and configured to measure the temperature inside freezing chamber 15.

In addition, cooling box 21 includes a cooling circuit, cooling tubes 50 and 51, and dampers 52 and 53. The cooling circuit includes a condenser, an expansion valve, an evaporator, and a compressor.

Cooling tube 50 is configured to supply the air cooled by the evaporator to refrigerating chamber 14. Cooling tube 51 is configured to supply the air cooled by the evaporator to freezing chamber 15.

Damper 52 is rotatably disposed inside cooling tube 50. By adjusting the rotation angle of damper 52, the flow rate at which cold air flows into refrigerating chamber 14 can be adjusted.

Damper 53 is rotatably disposed inside cooling tube 51. By adjusting the rotation angle of damper 53, the flow rate at which cold air flows into freezing chamber 15 can be adjusted. The rotation angles of dampers 52 and 53 are controlled by processor 20.

Processor 20 adjusts the opening degree of each damper to adjust the amount of cold air supplied to each of refrigerating chamber 14 and freezing chamber 15, thereby adjusting the temperature inside refrigerating chamber 14 and the temperature inside freezing chamber 15.

Temperature sensors 13A and 13B each transmit the sensed temperature information to processor 20. Processor 20 adjusts the opening degree of damper 52 based on the temperature sensed by temperature sensor 13A and the target value of the temperature inside refrigerating chamber 14. Similarly, processor 20 adjusts the opening degree of damper 53 based on the temperature sensed by temperature sensor 13B and the target value of the temperature inside freezing chamber 15.

In addition, storage 22 stores data used for calculating the opening degree of each of dampers 52 and 53 based on the difference between the temperature inside the cooling box and the target value of the temperature inside the cooling box.

Figure 4:
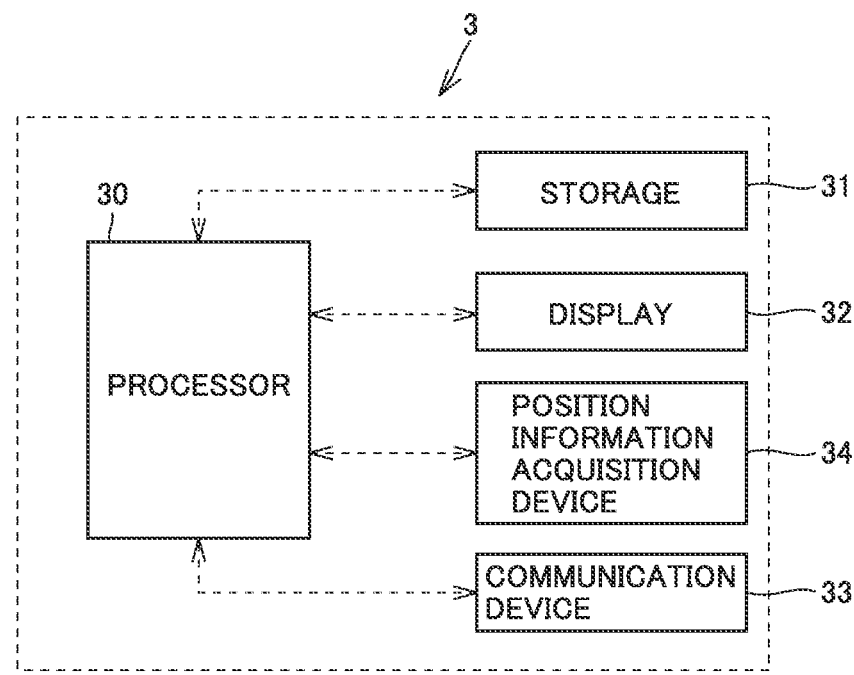
FIG. 4 is a block diagram showing the configuration of a deliverer terminal 3.

FIG. 4 is a block diagram showing the configuration of deliverer terminal 3. Since deliverer terminal 3 and deliverer terminal 4 are substantially identical in configuration, only deliverer terminal 3 will be hereinafter described. Deliverer terminal 3 includes a processor 30, a storage 31, a display 32, a communication device 33, and a position information acquisition device 34.

Processor 30 is configured to perform various computation processing based on the information acquired through communication device 33, the information stored in storage 31, and the like. The computation processing by processor 30 may be performed by software, or may be performed by hardware such as an electrical circuit.

Storage 31 is a non-volatile memory. Storage 31 stores various pieces of information. Display 32 serves as a screen for notifying deliverer 9 about various pieces of information. Display 32 may be a touch-sensitive liquid crystal display, for example. Deliverer 9 can perform various operations through display 32. In this way, display 32 also functions as an input interface through which deliverer 9 performs various operations. Communication device 33 is configured to communicate with server 5 through the Internet 7. Position information acquisition device 34 is configured to acquire the position information of deliverer terminal 3.

Position information acquisition device 34 transmits the acquired position information to processor 30. Processor 30 constantly transmits the position information through communication device 33 to server 5.

Figure 5:
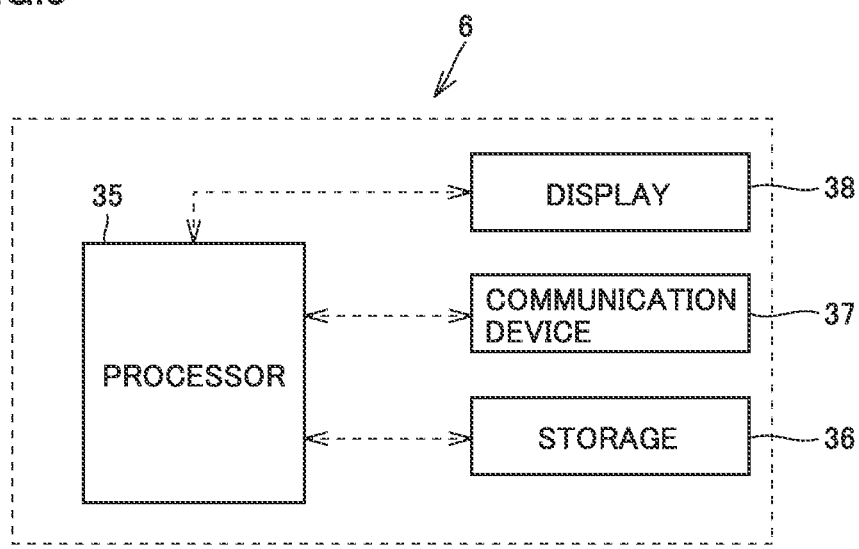
FIG. 5 is a block diagram schematically showing the configuration of a user terminal 6 used by a user 8.

FIG. 5 is a block diagram schematically showing the configuration of user terminal 6 used by user 8. User terminal 6 includes a processor 35, a storage 36, a communication device 37, and a display 38.

Storage 36 is a non-volatile memory and stores various pieces of information. Communication device 37 is configured to communicate with server 5 and the like through the Internet 7.

Display 38 is configured to notify user 8 about various pieces of information. Display 38 is a touch-sensitive display. For example, display 38 may be a liquid crystal display or an organic electroluminescence (EL) display. Thus, user 8 can input various pieces of information through display 38, so that display 38 functions also as an input interface.

Processor 35 carries out computation processing using the information acquired through communication device 37, the information input through display 38, the information stored in storage 36, and the like. The computation processing by processor 35 is performed by software or by hardware such as an electrical circuit.

When user 8 is going to purchase a commodity through an Internet mail order, user 8 accesses the homepage on the server of the mail order company, for example.

Figure 6:
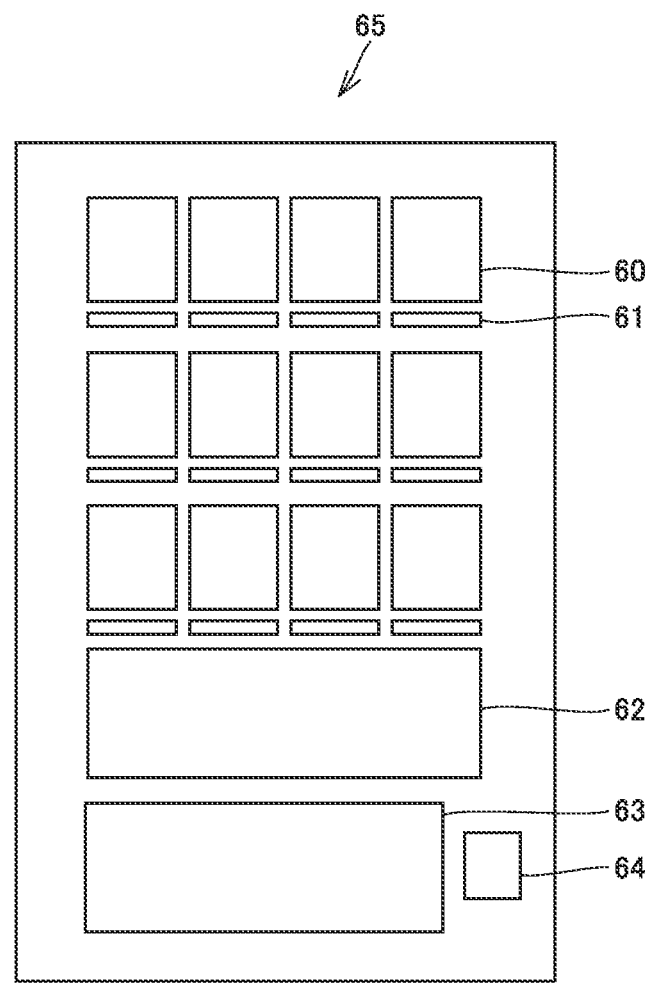
FIG. 6 is a diagram schematically showing an image displayed on a display 38 when a homepage of a mail order company is accessed.

FIG. 6 is a diagram schematically showing an image displayed on display 38 when a homepage of a mail order company is accessed.

An image 65 includes a plurality of commodity images 60, a purchase button 61 provided for each commodity image 60, a purchase list 62, a delivery form 63, and a decision button 64. Commodity image 60 includes a commodity image and a commodity description.

Purchase button 61 is provided for each commodity image 60. Purchase button 61 is selected when user 8 purchases a commodity shown in corresponding commodity image 60. Purchase list 62 contains a list of commodities to be purchased.

Delivery form 63 is used as a form to which a destination of a commodity to be purchased, desired date and time for delivery, a package recipient, and contact information of the package recipient are input.

Decision button 64 is selected by user 8 after completion of: decision of the commodity to be purchased; an input of the destination; and an input of the desired date and time for delivery. When decision button 64 is selected, the commodity to be purchased, the destination, and the desired date and time for delivery are determined.

User 8 can select vehicle 2 as a destination. In order to allow vehicle 2 to be designated as the destination, vehicle 2 needs to be registered in advance as a destination in the homepage of the mail order company.

Figure 7:
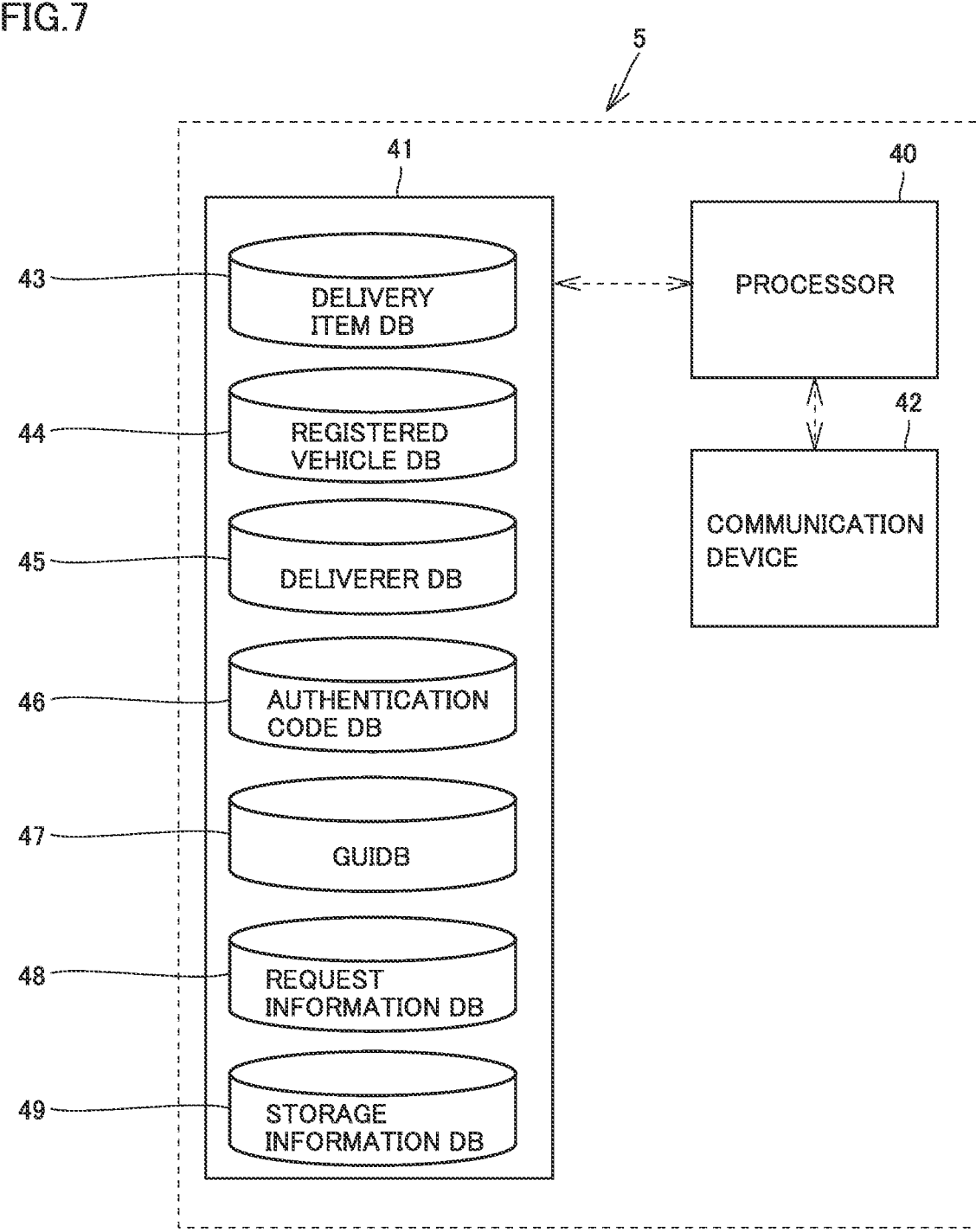
FIG. 7 is a block diagram schematically showing the configuration of a server 5.

FIG. 7 is a block diagram schematically showing the configuration of server 5. Server 5 includes a processor 40, a storage 41, and a communication device 42.

Communication device 42 is configured to be capable of communicating with user terminal 6, deliverer terminals 3 and 4, and vehicle 2.

Processor 40 performs computation processing using various pieces of information stored in storage 41, the information acquired through communication device 42, and the like. The computation processing by processor 40 is performed by software or by hardware such as an electrical circuit.

Storage 41 stores: a delivery item database 43, a registered vehicle database 44, a deliverer database 45, an authentication code database 46, a graphical user interface (GUI) database 47, a request information database 48, and a storage information database 49.

GUI database 47 stores the information about the homepage shown in FIG. 6. For example, processor 40 acquires the request information based on GUI database 47 and the operation performed by user 8 on the homepage. This request information includes: information about the commodity purchased by user 8; the destination and the desired time for delivery; the information for specifying user 8; and the contact information of the package recipient. Then, processor 40 updates request information database 48 based on the acquired request information.

Request information database 48 is configured to store the request information from each user. FIG. 8 is a schematic diagram schematically showing request information database 48. Request information database 48 stores a requester ID, a delivery item ID, a delivery item, a package recipient, a destination, delivery time, and contact information of the package recipient. "Requester ID" is set for each user. "Delivery Item" shows a commodity that user 8 decided to purchase in the homepage. "Delivery Date and Time" shows the desired date and time for delivery that is input by user 8 in the homepage. When user 8 designates vehicle 2 as the destination, the registered vehicle ID of vehicle 2 is input as "Destination". "Contact Information of Package Recipient" shows a mail address, a telephone number and the like of the package recipient, for example.

Registered vehicle database 44 stores vehicle information registered in advance as a destination by each user.

FIG. 9 is a diagram schematically showing registered vehicle database 44. Registered vehicle database 44 stores a registered vehicle ID, a vehicle number indicated on a license plate, a requester ID, a communication ID of the vehicle, a registrant contact information, a vehicle type/color, and position information.

"Registered vehicle ID" is registered for each registered vehicle. As to "Requester ID", the ID of the user who registered the vehicle is stored. "Communication ID" is used for communicating with communication device 25 of the registered vehicle.

As to "Vehicle Color/Type", the information about the color and type of the registered vehicle is stored. As to "Position information", the position information of the vehicle is stored. This position information is updated as appropriate based on the position information acquired from the vehicle.

Deliverer database 45 stores the information about deliverer 9 and 10 and deliverer terminals 3 and 4 carried by deliverers 9 and 10, respectively.

FIG. 10 is a diagram schematically showing deliverer database 45. Deliverer database 45 stores a deliverer ID, a deliverer mobile phone number, a deliverer name, position information, and a deliverer terminal ID. "Deliverer ID" is set for each of deliverers 9 and 10. "Deliverer Mobile Phone Number" shows the number of the mobile phone provided to each of deliverers 9 and 10. As to "Position information", the position information transmitted from each of deliverer terminals 3 and 4 is stored. "Deliverer Terminal ID" is set for each of deliverer terminals 3 and 4.

Based on request information database 48, deliverer database 45 and registered vehicle database 44, processor 40 determines the delivery time of each delivery item W, and deliverers 9 and 10 for each delivery item W to be delivered.

Then, for the delivery item for which a vehicle is designated as its destination, an authentication code is created for each delivery item ID of this delivery item.

FIG. 11 is a diagram schematically showing an authentication code database 46. Authentication code database 46 stores a registered vehicle ID and code information.

FIG. 12 is a diagram schematically showing a storage information database 49. Storage information database 49 includes a commodity name, a storage type, and a storage temperature. As to "Commodity Name", an item name of each commodity is stored. As to "Storage Type", one of "refrigeration required", "freezing required" and "room temperature" is stored. For example, "refrigeration required" shows the information that the commodity needs to be stored under refrigeration. Thus, this commodity is to be stored while being accommodated in the refrigerating chamber. As to "Storage Temperature", the storage temperature for the commodity is stored. As storage information, information about $CO_2$ concentration, humidity and the like may be included in addition to the storage temperature.

Then, based on storage information database 49, request information database 48, deliverer database 45, registered vehicle database 44, and authentication code database 46, processor 40 allocates the deliverer, the delivery date and time and the like for each delivery item W, thereby constructing delivery item database 43.

FIG. 13 is a diagram schematically showing delivery item database 43. Delivery item database 43 includes a delivery item ID, a delivery item, a package recipient, a destination, contact information of the destination, delivery date and time, a deliverer terminal ID, authentication information, storage information, and contact information of the package recipient.

Then, based on delivery item database 43, processor 40 transmits the delivery information to each of deliverer terminals 3 and 4. When there are a plurality of delivery items W, the storage temperature and the storage type for each delivery item W are stored as "Storage Information".

Then, based on delivery item database 43, processor 40 transmits the delivery information to each of deliverer terminals 3 and 4.

Figure 14:
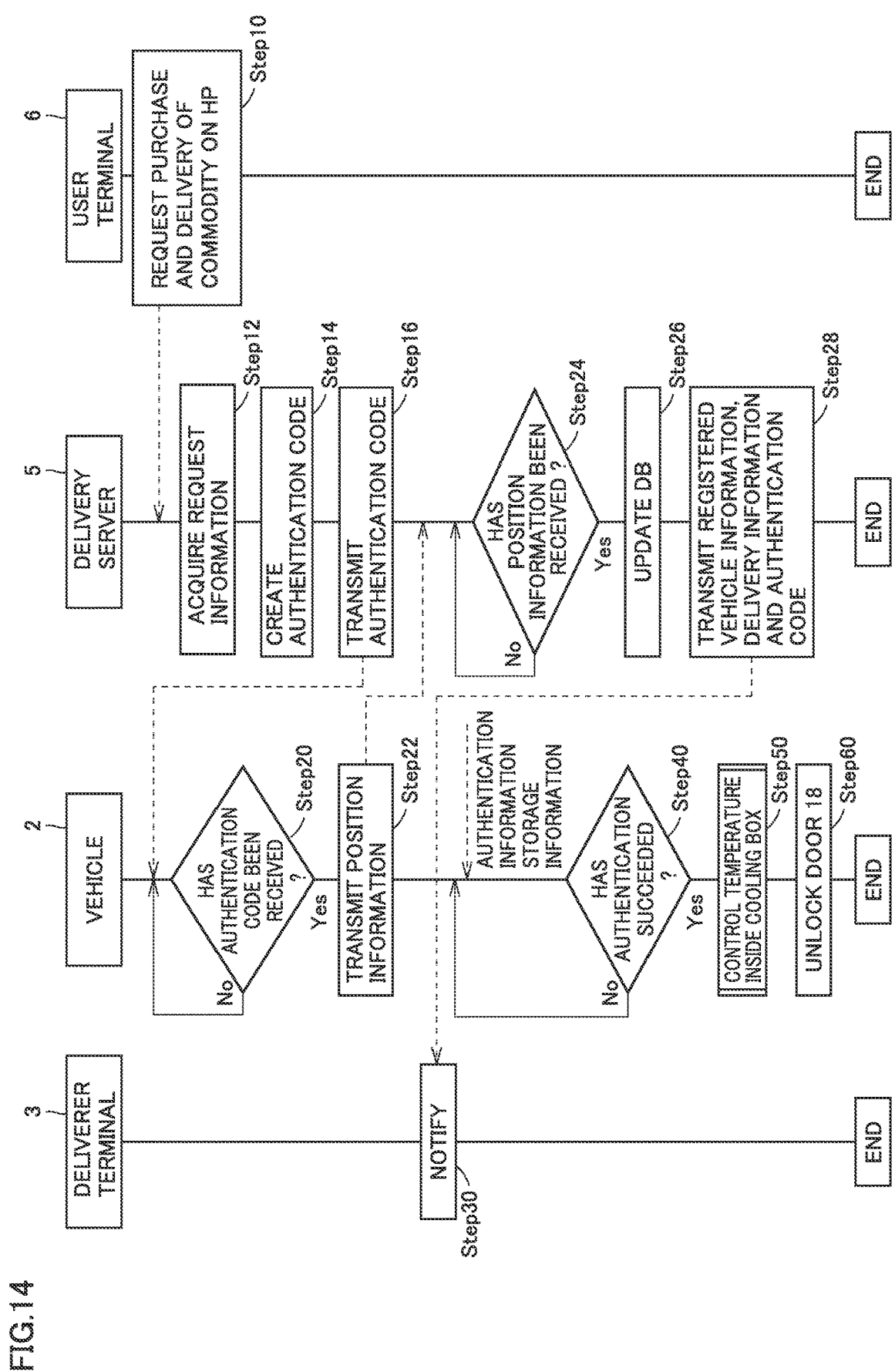
FIG. 14 is a state diagram of delivery system 1.

The operation of delivery system 1 configured as described above will be hereinafter described with reference to FIG. 14 and the like. FIG. 14 is a state diagram of delivery system 1. In the example shown in this FIG. 14, an explanation will be given with regard to the case where deliverer 9 delivers a purchased commodity to vehicle 2.

When user 8 requests purchase and delivery of a commodity on a homepage through user terminal 6 (step 10), server 5 acquires the request information (step 12). As the destination of this request information, the registered vehicle ID of vehicle 2 is stored.

Then, processor 40 creates an authentication code of vehicle 2 (step 14). The newly created authentication code is stored in authentication code database 46. This authentication code is used for undoing lock 19 of vehicle 2.

Processor 40 transmits the authentication information to vehicle 2 that is specified by the request information (step 16). In addition, by acquiring the communication ID of vehicle 2 from registered vehicle database 44, processor 40 can transmit the authentication information to vehicle 2. In addition, when the authentication information is transmitted, the communication ID of communication device 42 of server 5 is also transmitted.

Also during parking, traveling and the like, vehicle 2 determines whether it has received the authentication information or not (step 20).

When processor 20 of vehicle 2 determines that it has acquired the authentication code (Yes in step 20), it transmits the position information to server 5 (step 22). The position information of vehicle 2 can be received by position information acquisition device 23. When the position information is transmitted, the registered vehicle ID is also transmitted, for example.

When server 5 transmits the authentication code (step 16), server 5 waits until it acquires the position information from vehicle 2 (step 24).

When processor 40 of server 5 acquires the position information from vehicle 2, processor 40 updates each types of databases (step 26). Specifically, processor 40 updates the position information of registered vehicle database 44, delivery item database 43, and the like. Based on this updated delivery item database 43, the delivery information and the like are transmitted to deliverer terminals 3 and 4.

Then, in the example shown in this FIG. 14, the registered vehicle information, the delivery information, and the authentication code are transmitted to deliverer terminal 3 (step 28).

Based on the registered vehicle ID of vehicle 2, the registered vehicle information of vehicle 2 can be acquired from registered vehicle database 44. The delivery information can be acquired from the updated delivery item database 43. The authentication code is created in step 14 and stored in authentication code database 46.

When deliverer terminal 3 receives the registered vehicle information, the delivery information and the authentication code, it notifies deliverer 9 that the above-described each information has been received in display 32 (step 30). Specifically, display 32 shows that each information has been received.

Then, deliverer 9 delivers delivery item W based on the received information. In this case, since the registered vehicle information transmitted to deliverer 9 includes the position information of vehicle 2, deliverer 9 can reach the vicinity of vehicle 2. Furthermore, since the registered vehicle information includes the vehicle color and the vehicle type of vehicle 2, vehicle 2 can be easily found out.

Then, in order to allow deliverer 9 to place delivery item W in cooling box 21 so as to be accommodated therein, lock 19 needs to be undone.

Furthermore, in order to allow delivery item W to be stored in cooling box 21 without deteriorating the quality of delivery item W, the storage information of each delivery item W needs to be transmitted to vehicle 2. In this case, deliverer terminal 3 receives the delivery information from server 5. This delivery information includes storage information of each delivery item W. Also, this storage information includes the storage temperature and the storage type of each delivery item W. The storage information may also include the information about $CO_2$ concentration and humidity and the like that are set when delivery item W is stored.

Deliverer 9 transmits the authentication code and the storage information of each delivery item W to communication device 25 of vehicle 2. The storage information includes the information showing the commodity name, the information showing the storage type, and the information showing the storage temperature.

Processor 20 of vehicle 2 performs authentication using the authentication code received through communication device 25, and the authentication code having been received in advance (step 40). Processor 20 waits until authentication succeeds.

When authentication succeeds (Yes in step 40), outside door 18 of vehicle 2 is unlocked, and thereafter, processor 20 controls the temperature inside cooling box 21 (step 50).

Figure 15:
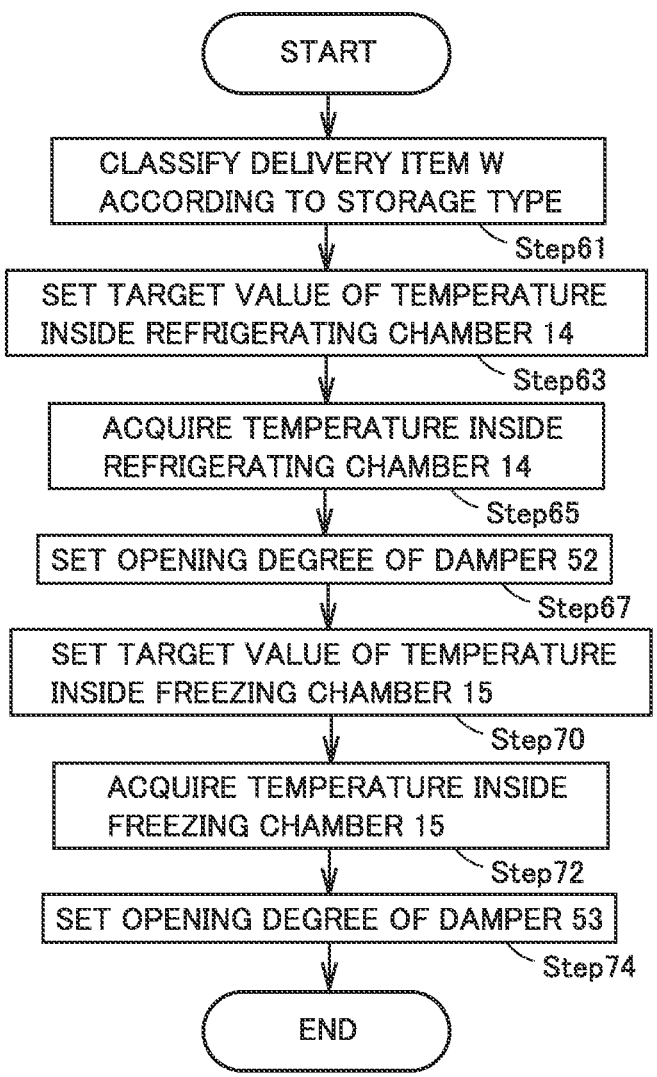
FIG. 15 is a flow chart specifically illustrating control of temperature inside a cooling box.

FIG. 15 is a flow chart specifically showing temperature control inside a cooling box. Processor 20 classifies delivery item W according to the storage type (step 61).

Processor 20 acquires the storage information for each delivery item W through communication device 25 from deliverer terminal 3. Thus, processor 20 can classify delivery item W based on this information. Specifically, processor 20 of vehicle 2 classifies delivery items W into (i) delivery item W for which the storage type is designated as "refrigeration required" and (ii) delivery item W for which the storage type is designated as "freezing required".

Processor 20 sets the target value of the temperature inside refrigerating chamber 14 (step 63). The lowest storage temperature among the storage temperatures of delivery items W for which the storage type is designated as "refrigeration required" is defined as a target value of the temperature inside refrigerating chamber 14. In this way, vehicle 2 acquires the target value of the temperature inside refrigerating chamber 14 (environment inside refrigerating chamber 14) from deliverer terminal 3.

Processor 20 acquires the temperature inside refrigerating chamber 14 from temperature sensor 13A (step 65). Processor 20 sets the opening degree of damper 52 (step 67).

Specifically, processor 20 sets the opening degree of damper 52 based on the difference between the target value of the temperature inside refrigerating chamber 14 and the temperature inside refrigerating chamber 14 that is measured by temperature sensor 13A.

In addition, the opening degree of damper 52 can be derived from: the difference between the measurement temperature inside refrigerating chamber 14 and the target value; and the data stored in storage 22.

Then, processor 20 sets the target value of the temperature inside freezing chamber 15 (step 70). The lowest storage temperature among the storage temperatures of the delivery items for which the storage type is designated as "freezing required" is defined as a target value of the temperature inside freezing chamber 15. In this way, vehicle 2 acquires the target value of the temperature inside freezing chamber 15 (environment inside freezing chamber 15) from deliverer terminal 3.

Then, processor 20 acquires the temperature inside freezing chamber 15 from temperature sensor 13B (step 72). Processor 20 sets the opening degree of damper 53 (step 74).

By setting the temperature inside refrigerating chamber 14 and the temperature inside freezing chamber 15 as described above, it becomes possible to suppress a deterioration in quality of each of delivery items W accommodated in refrigerating chamber 14 and freezing chamber 15.

In the present first embodiment, an explanation has been given with regard to an example focusing attention on the temperature inside the cooling box as an environment inside cooling box 21, but $CO_2$ concentration and humidity inside the cooling box may also be taken into consideration as an environment inside the cooling box.

Referring back to FIG. 14, after vehicle 2 starts to control the temperature inside the cooling box (step 50), lock 19 is undone to unlock outside door 18 (step 60).

When outside door 18 is unlocked, deliverer 9 can place delivery item W in cooling box 21 so as to be accommodated therein. In this case, deliverer terminal 3 has received the storage information for each delivery item W. Thus, with the help of this deliverer terminal 3, delivery item W can be accommodated in refrigerating chamber 14 or freezing chamber 15 according to the storage type of each delivery item W.

After deliverer 9 places delivery item W in cooling box 21 so as to be accommodated therein, this deliverer 9 closes outside door 18 to complete accommodation of delivery item W in cooling box 21. Thus, before completion of accommodation of delivery item W, vehicle 2 has acquired the target values of the temperatures inside refrigerating chamber 14 and freezing chamber 15.

In the above-described first embodiment, deliverer terminal 3 transmits the storage information together with the authentication information to vehicle 2, but the storage information of delivery item W may be transmitted at the timing when outside door 18 is unlocked.

Second Embodiment

The delivery system according to the second embodiment is identical in configuration to delivery system 1 according to the first embodiment. However, the delivery system according to the second embodiment is different, for example, in information transmitted from server 5 to vehicle 2 as compared with delivery system 1 according to the first embodiment.

Figure 16:
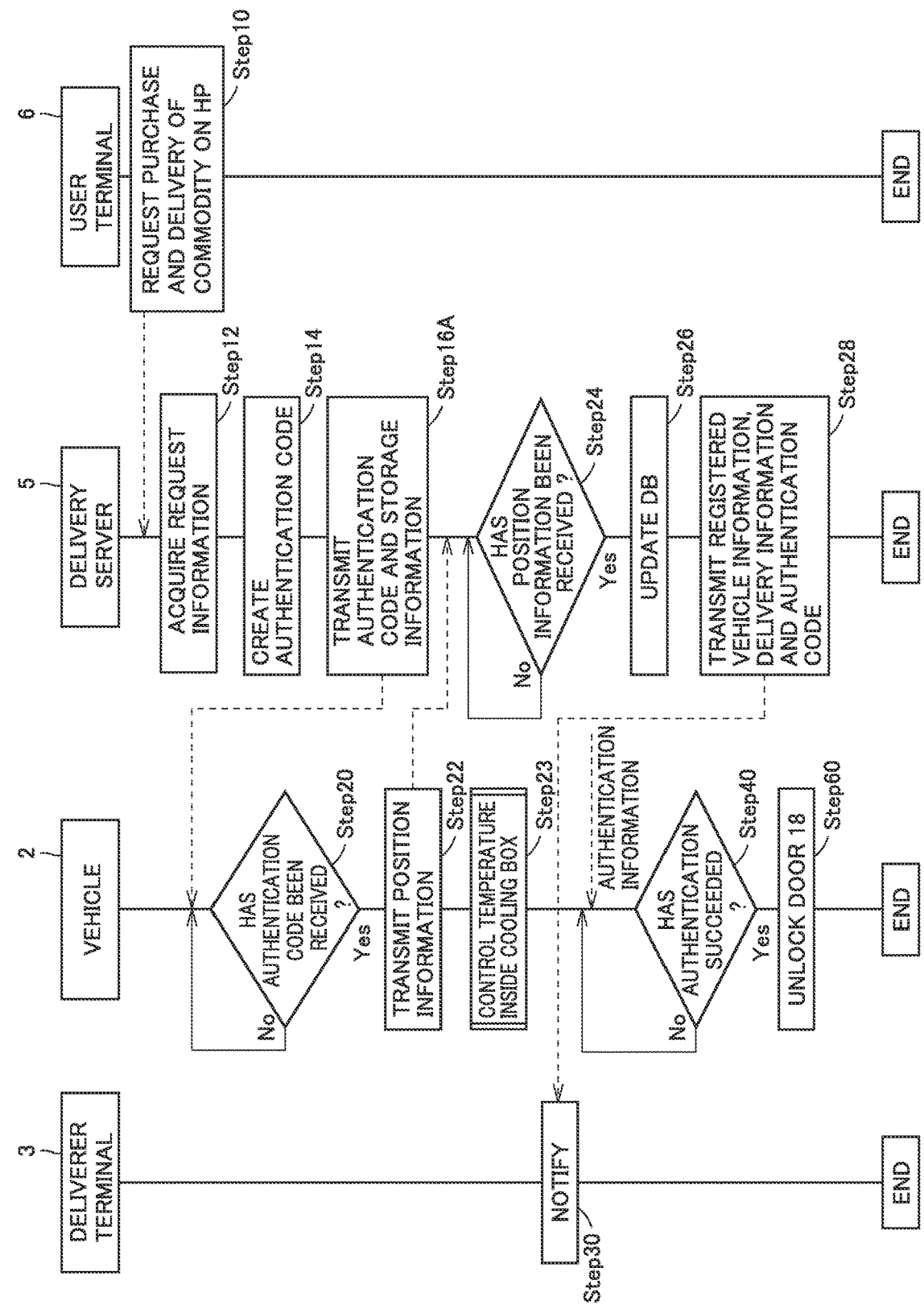
FIG. 16 is a state diagram of a delivery system according to the second embodiment.

FIG. 16 is a state diagram of the delivery system according to the second embodiment. In the second embodiment, after the authentication code is created (step 14), server 5 transmits the authentication information and the storage information of each delivery item W to vehicle 2 (step 16A).

When it is determined that vehicle 2 has received the authentication code (Yes in step 20), it transmits the position information (step 22).

Then, processor 20 of vehicle 2 controls the temperature inside the cooling box based on the storage information acquired in the above-described step 16A (step 23). This control for temperature inside the cooling box is the same as the control for temperature inside the cooling box shown in FIG. 15.

Then, in vehicle 2, when authentication is conducted (step 40) and this authentication succeeds (Yes in step 40), outside door 18 is unlocked (step 60). Then, deliverer 9 places delivery item W in cooling box 21 so as to be accommodated therein.

It often takes some time until accommodation of delivery item W is completed after processor 20 of vehicle 2 starts to control the temperature inside the cooling box.

Accordingly, at the timing when deliverer 9 places delivery item W so as to be accommodated, the temperature inside refrigerating chamber 14 has already reached the target value or thereabout, and the temperature inside freezing chamber 15 has also already reached the target value or thereabout.

Thus, it becomes possible to reduce the time period during which delivery item W is exposed to the atmosphere at a temperature higher than the temperature of the target value, so that a deterioration in quality of delivery item W can be suppressed.

Third Embodiment

Figure 17:
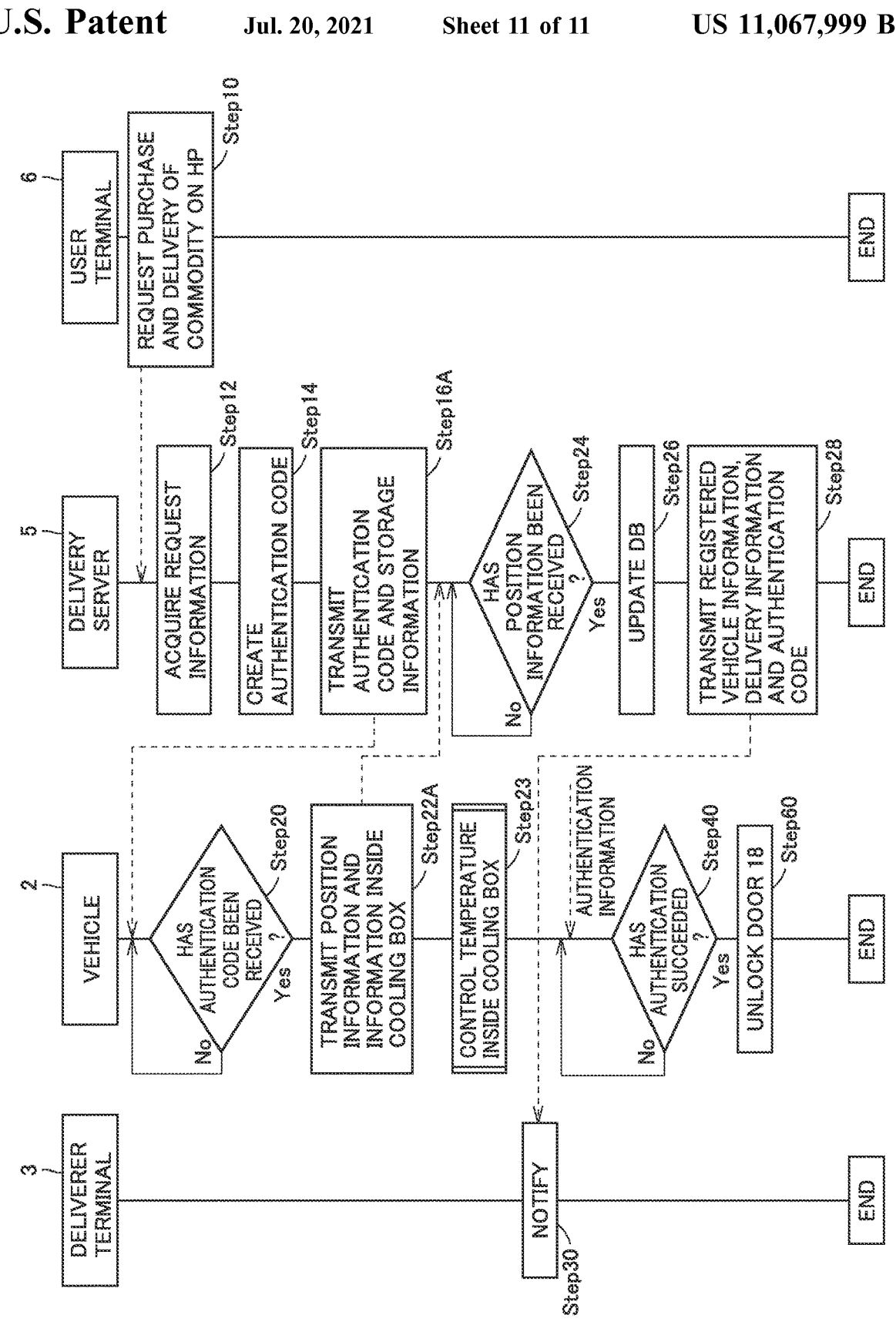
FIG. 17 is a state diagram of a delivery system according to the third embodiment.

Referring to FIG. 17, a delivery system according to the third embodiment will be hereinafter described. The delivery system according to the third embodiment is identical in configuration to delivery system 1 according to the first embodiment. FIG. 17 is a state diagram of the delivery system according to the third embodiment.

In the delivery system according to the present third embodiment, after server 5 creates an authentication code (step 14), server 5 transmits the authentication code and the storage information to vehicle 2 (step 16A).

When it is determined that vehicle 2 has received the authentication code (Yes in step 20), vehicle 2 transmits the position information and the information about the temperature inside the cooling box to server 5 (step 22A).

The information about the temperature inside the cooling box includes the temperature inside refrigerating chamber 14 and the temperature inside freezing chamber 15. In addition, processor 20 can acquire the temperature inside refrigerating chamber 14 from temperature sensor 13A. Processor 20 can acquire the temperature inside freezing chamber 15 from temperature sensor 13B.

In this case, the information about the temperature inside the cooling box may include: the expected information about the expected time at which the temperature inside refrigerating chamber 14 reaches the target value; and the expected information about the expected time at which the temperature inside freezing chamber 15 reaches the target value.

After vehicle 2 transmits the position information and the information inside the cooling box to server 5, the temperature inside the cooling box is controlled (step 23).

After it is determined that server 5 has received the position information (Yes in step 24), processor 40 of server 5 updates the information in delivery item database 43 and the like.

In this case, since server 5 has already acquired the information about the temperature inside cooling box 21, it can expect the time at which the temperature inside cooling box 21 reaches the target value. Thereby, processor 40 can arrange the schedule such that delivery item W is delivered after the temperature inside cooling box 21 reaches the target value.

Then, when delivery item database 43 is updated, "Delivery Time" of delivery item database 43 can be set. Based on the updated delivery item database 43, processor 40 transmits the registered vehicle information, the delivery information and the authentication code to deliverer terminal 3 (step 28).

Deliverer terminal 3 notifies deliverer 9 about the received information (step 30). Then, deliverer 9 delivers delivery item W based on the received information. As a result, when deliverer 9 places delivery item W in cooling box 2 so as to be accommodated therein, the temperature inside cooling box 21 reaches its target temperature, so that delivery item W can be satisfactorily stored.

In the delivery system according to the above-described third embodiment, vehicle 2 transmits the information inside the cooling box to server 5, but may transmit the information inside the cooling box to deliverer terminal 3.

Specifically, after authentication succeeds (Yes in step 40), the information inside the cooling box may be transmitted to deliverer terminal 3.

Thereby, through deliverer terminal 3, deliverer 9 can grasp the temperature inside refrigerating chamber 14 and the temperature inside freezing chamber 15. When each of the temperatures inside refrigerating chamber 14 and freezing chamber 15 is high, deliverer 9 does not place delivery item W in cooling box 21, but notifies the package recipient that delivery item W will not be delivered to the package recipient since the temperature inside the cooling box is not appropriate. For example, deliverer 9 sends an e-mail to the package recipient. In this way, by refraining from placing delivery item W in the cooling box when the temperature inside the cooling box is not appropriate, a deterioration in quality of delivery item W can be suppressed.

In the above-described first and second embodiments, an explanation has been given with regard to an example in which one refrigerating chamber 14 and one freezing chamber 15 are provided in cooling box 21, but a plurality of refrigerating chambers and freezing chambers may be provided.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:
1. A vehicle comprising:
a cooling box in which a delivery item can be accommodated, the cooling box being provided in the vehicle which is designated as a delivery destination and the cooling box including at least one damper;

a communication device configured to communicate with at least one server and a deliverer terminal that is used by a deliverer during delivery and to acquire a target value before completion of placement of the delivery item in the cooling box so as to be accommodated therein; and a processor device configured to acquire information of the delivery item through the communication device, wherein the processor device is configured to
set the target value which is a temperature inside of the cooling box based on the information of the delivery item, and
adjust an opening degree of the at least one damper based on the target value of the temperature inside of the cooling box to adjust amount of cold air supplied to at least one chamber.

2. The vehicle according to claim 1, wherein the communication device is further configured to transmit information showing environment inside the cooling box to the at least one server and the deliverer terminal before the completion of placement of the delivery item so as to be accommodated.

3. The vehicle according to claim 2, wherein the information showing the environment inside the cooling box includes an expected time at which the temperature inside the cooling box reaches the target value.

4. The vehicle according to claim 1, wherein the processor device controls the cooling box such that the temperature inside of the cooling box becomes the target value before completion of placement of the delivery item in the cooling box.

5. The vehicle according to claim 1, wherein when the delivery item includes a plurality of items, the processor device sets, as the target value, a minimum storage temperature of storage temperatures of the plurality of items.

6. A delivery system comprising:
a vehicle including a cooling box in which a delivery item can be accommodated, the cooling box being provided in the vehicle which is designated as a delivery destination and the cooling box including at least one damper;
a deliverer terminal configured to be used by a deliverer during delivery; and
a server configured to communicate with the deliverer terminal and the vehicle, wherein
the vehicle includes
a communication device configured to communicate with at least one server and a deliverer terminal that is used by a deliverer during delivery and to acquire a target value before completion of placement of the delivery item in the cooling box so as to be accommodated therein;
a processor device configured to acquire information of the delivery item through the communication device;
the processor device sets the target value which is a temperature inside of the cooling box based on the information of the delivery item; and
the processor device adjusts an opening degree of the at least one damper based on the target value of the temperature inside of the cooling box to adjust amount of cold air supplied to at least one chamber.

* * * * *